June 17, 1969  E. J. SCHIMITSCHEK ET AL  3,451,007
LIQUID LASER CELL
Filed Dec. 10, 1963
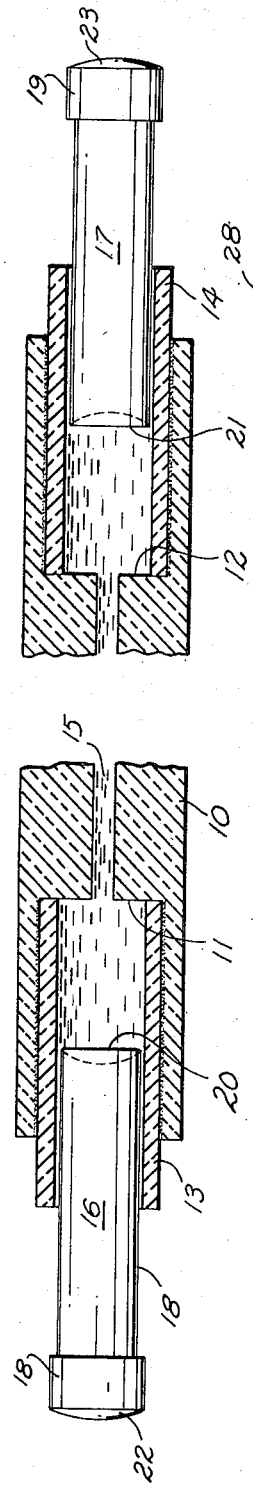
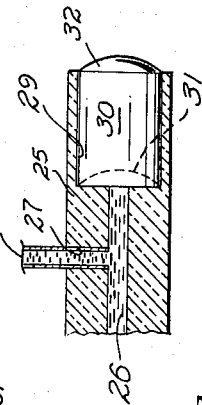
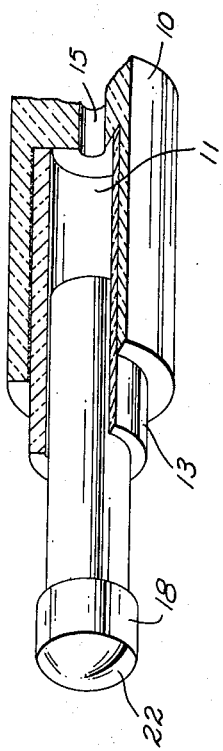
FIG. 1
FIG. 2
FIG. 3
INVENTORS
ERHARD J. SCHIMITSCHEK
EDWARD R. SCHUMACHER
BY
ATTORNEYS 3,451,007
LIQUID LASER CELL
Erhard J. Schimitschek, 1622 Plum St. 92106, and Edward R. Schumacher, 4728 54th St. 92115, both of San Diego, Calif.
Filed Dec. 10, 1963, Ser. No. 329,593
Int. Cl. H01s 3/20, 3/05
U.S. Cl. 331—94.5                                2 Claims

ABSTRACT OF THE DISCLOSURE

A liquid laser cell formed of a quartz tube having an axial capillary passage filled with the lasing solution. Each end of the capillary opens into a reservoir of lasing solution and each reservoir is closed at its outer end by quartz pistons provided with partial mirror surfaces. Preferably the pistons slidably engage sleeve members carried by the reservoir walls so as to be drawn toward one another when the liquid is cooled. The pistons are drawn together by surface tension and thus maintain their essential flush contact with the liquid.

---

The invention described herein may be manufactured and used by or for the Government of the United States of America for governmental purposes without the payment of any royalties thereon or therefor.

The present invention relates to a laser cell and more particularly, to a liquid laser cell and specifically, to a liquid laser cell for producing visible light.

Attempts have been made to provide an operative liquid laser; however, to this time no one, as far as is presently known, has been able to form a visible output. One application did indicate stimulation but no visible output resulted.

An object of the present invention is to provide a liquid laser cell for producing a visible output.

Another object of the present invention is to provide a practical laser cell.

Other objects and many of the attendant advantages of this invention will be readily appreciated as the same becomes better understood by reference to the following detailed description when considered in connection with the accompanying drawings wherein:

FIG. 1 is a cross-sectional view of one embodiment of the liquid laser cell; and FIG. 2 is a perspective view of one end of the liquid laser cell; and FIG. 3 is a cross-sectional view of another embodiment of the liquid laser cell.

FIG. 1 illustrates an embodiment of the invention which comprises a main body portion 10, having a set of counterbores 11 and 12 at either end respectively. Sleeves 13 and 14 are fitted into and epoxied permanently into place in the counterbores 11 and 12, respectively. The sleeves 13 and 14 are provided for the enlarged cylinder-like counterbores due to the fact that the drilling operation which produces the bores, produces a bore which is slightly tapered and rough. Due to the fact that a piston-like member must slide in close engagement with the walls of the cylinders the sleeves are provided.

The main body portion 10 is centrally bored to form a liquid receiving cavity 15 in communication with the counterbore portions 11 and 12. Slideably received in sleeves 13 and 14 are piston-like members 16 and 17 respectively. The piston-like members 16 and 17 have larger diameter portions 18 and 19 at their respective outer ends for ease in handling. It is to be understood that the enlarged outer portions could be done away with, i.e. made the same diameter as the main piston body if desired, or made larger if desired.

Partial mirrors 20 and 21 are deposited on the inner ends of piston-like members 16 and 17 respectively, which are in contact with the liquid in the laser cell. The outer ends of piston-like members 16 and 17 remote from contact with the liquid may also have partial mirrors deposited on their ends as at 22 and 23. It is to be understood that the partial mirrors will be deposited only on 20, 21 or 22, 23 and not on both. A chelate, comprising EuB$_3$, dissolved in alcohol, is the liquid material utilized in the present invention and the alcohol breaks down the partial mirrors 20 and 21. Therefore, it is believed that it is more practical to form the partial mirrors as at 22 and 23 on the outer ends of piston-like members 16 and 17 respectively, remote from the liquid material.

A confocal arrangement is provided for the mirrors i.e., the radius of curvature of the mirror surfaces 20, 21 and 22, 23 is approximately equal to the length of the capillary if surfaces 20, 21 are used as the mirror surfaces; or approximately equal to the length of the capillary 15 plus the length of pistons 16 and 17 if surfaces 22 and 23 are used as the reflecting surfaces. In this context when a capillary 15 is referred to, it is intended that the entire liquid link be considered i.e., any liquid contained within the larger counterbore portions would also be included in the measurement.

In that the refractive index of quartz, of which all the parts are made, is approximately equal to the liquid used in the present application, laser inner surfaces 20 and 21 or outer mirrored surfaces 22 and 23 may be used as the reflecting surfaces.

In operation, the capillary 15 and conterbores delineated by the surfaces of sleeves 13 and 14 are filled with a chelate, in this case EuB$_3$, dispersed in alcohol, and the pistons 16 and 17 inserted into sleeves 13 and 14 respectively until the inner surfaces 20 and 21 contact the liquid. The unit is then mounted in the laser head and cooled by a flow of precooled nitrogen gas to approximately —150° C. As the cooling takes place the liquid volume contracts and pistons 16 and 17 are drawn toward one another due to the surface tension of the liquid on the surfaces 20 and 21.

After the cooling operation the unit is activated by a light source i.e. a pulsed xenon gas tube and the unit caused to lase and produce visible light pulses the frequency of which is determined by the frequency of the pumping unit.

In the present invention the diameter of the capillary 15 has been found to be critical as determining whether the laser cell produces visible light or not. The critical fact is the absorption coefficient of the chelate utilized in that, if the diameter of the capillary is too large, the pumping source cannot activate the chelate material due to the extremely sharp fall-off of absorption across the diameter of the capillary. In the present instance, when the EuB$_3$ was used as the laser material it was found that a 0.8 millimeter capillary worked while a 2 millimeter capillary did not.

It is to be understood that reference was made to mirrored surfaces 20 and 21 and 22, 23 being partial mirrors however it is to be understood that one of either set of mirrors could be opaque and the other a partial mirror as well. All that is necessary is that one mirror be sufficiently transmissive to allow visible light to pass through the mirror.

FIG. 3 illustrates another embodiment of the invention wherein a main body portion 25 is centrally drilled to form a liquid receiving chamber 26. A passageway 27 is provided through the wall of main body portion 25 into which is inserted a connection 28 to a reservoir, not shown.

The end of the main body portion 25 is counterbored as at 29 and a plug 30 inserted into the counterbored portion 29. The plug is epoxied into place. A partial mirror may be deposited either on inner surface 31 or outer surface 32, respectively, of plug 30.

The other end of the cell is identical except for passageway 27 and connection 28.

The cell of FIG. 3 operates the same as that of FIG. 1 except for the substitution of fixed for movable mirrors. In that there is not the provision for contraction of the chelate in FIG. 3 as there is in FIG. 1 a reservoir is provided which allows for the liquid receiving cavity 26 being completely occupied by liquid at all times.

The operation of the cell of FIG. 3 is exactly the same as that of FIG. 1.

The present invention accomplishes the production of visible light utilizing a laser material for the first time due to the fact that it was found that the diameter of the laser cell bears a direct relationship to the chelate utilized as the laser material.

The present invention accomplishes a practical liquid laser cell in a simple and extremely uncomplicated manner utilizing conventional materials.

Obviously many modifications and variations of the present invention are possible in the light of the above teachings. It is therefore to be understood that within the scope of the appended claims the invention may be practiced otherwise than as specifically described.

What is claimed is:
1. A liquid laser cell comprising:
an elongate tube formed of a light transmissive material and provided with an axial capillary bore extending substantially the length of the tube and having a diameter of about 0.8 millimeter,
each end portion of said tube being counterbored to form a radially-enlarged open-ended reservoir disposed in fluid communication with each end of said capillary bore,
a piston member slidably mounted in each reservoir and extending into the reservoir a distance short of the proximate end of said capillary bore for closing said open end of the reservoir,
a liquid lasing solution filling said capillary bore and said reservoirs, and
each of said piston members being provided with a mirror surface disposed mutually in a confocal arrangement for reflecting light, at least one of said surfaces being a partial mirror for permitting egress of the laser light beam.

2. The cell of claim 1 further including:
a sleeve member lining the wall of each reservoir,
said piston members being slidably mounted on said sleeves.

References Cited

UNITED STATES PATENTS 3,319,183   5/1967   Lempicki et al. _____ 331—94.5

RONALD L. WIBERT, *Primary Examiner.*

W. L. SIKES, *Assistant Examiner.*